United States Patent [19]

Belles

[11] 4,362,865

[45] Dec. 7, 1982

[54] METHOD FOR CONTINUOUS SOLUBLE POLYPROPYLENE RECOVERY FROM HYDROCARBON POLYMERIZATION MEDIA

[75] Inventor: Benjamin P. Belles, St. Charles, Ill.

[73] Assignee: Standard Oil Company (Indiana), Chicago, Ill.

[21] Appl. No.: 235,678

[22] Filed: Feb. 18, 1981

Related U.S. Application Data

[63] Continuation-in-part of Ser. No. 63,726, Aug. 6, 1979, abandoned, which is a continuation of Ser. No. 892,310, Mar. 31, 1978, abandoned, which is a continuation of Ser. No. 712,780, Aug. 9, 1976, Pat. No. 4,098,992, which is a continuation of Ser. No. 597,338, Jul. 21, 1975, abandoned, which is a continuation-in-part of Ser. No. 523,721, Nov. 14, 1974, abandoned.

[51] Int. Cl.$^3$ ............................................. C08F 6/12
[52] U.S. Cl. .................................. 528/500; 526/351; 585/802
[58] Field of Search ................. 528/500, 503; 585/802

[56] References Cited

U.S. PATENT DOCUMENTS

| | | | |
|---|---|---|---|
| 2,801,234 | 7/1957 | Hanson | 260/94.7 |
| 3,234,995 | 2/1960 | Van Den Berg et al. | 159/47 |
| 3,296,240 | 1/1967 | MacDonald et al. | 260/93.7 |
| 3,337,422 | 8/1967 | Colton | 203/36 |
| 3,437,645 | 4/1969 | Paige et al. | 260/80.78 |
| 3,658,774 | 4/1972 | Liu | 260/80.78 |
| 3,705,885 | 12/1972 | Hollstein et al. | 260/93.7 |
| 3,755,484 | 8/1973 | Langer | 260/671 B |
| 4,098,992 | 7/1978 | Belles | 528/500 |

FOREIGN PATENT DOCUMENTS 1318518 7/1963 France .
988999 4/1965 United Kingdom .

Primary Examiner—Stanford M. Levin
Attorney, Agent, or Firm—David E. Boone; William T. McClain; William H. Magidson

[57] ABSTRACT

Polypropylene is recovered from a dilute solution in spent organic polymerization medium in a process comprising: (1) partial steam stripping of volatile components from said medium to form an aqueous phase and a concentrated, water-insoluble phase containing the soluble polypropylene; (2) separating said concentrated water-insoluble phase and loading it into an evaporator; (3) evaporating the remaining volatile components from the separated said water-insoluble phase leaving fluidized polypropylene which when drawn off and solidified is suitable for commercial use.

7 Claims, 1 Drawing Figure

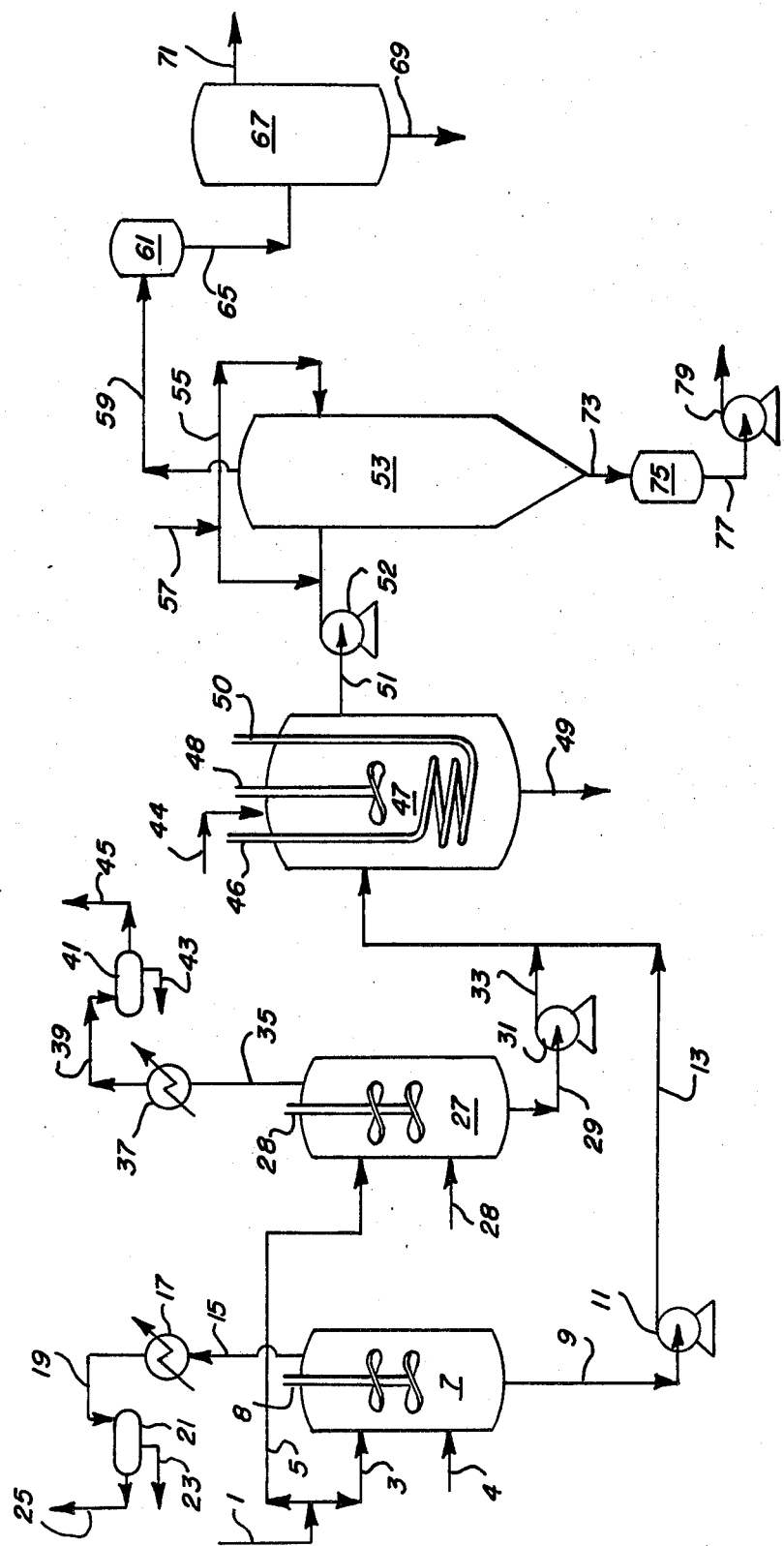

METHOD FOR CONTINUOUS SOLUBLE POLYPROPYLENE RECOVERY FROM HYDROCARBON POLYMERIZATION MEDIA

RELATED APPLICATIONS

This is a continuation-in-part of copending application Ser. No. 63,726, filed Aug. 6, 1979, now abandoned) which is a continuation of application Ser. No. 892,310, filed Mar. 31, 1978, (now abandoned) which is a continuation of Ser. No. 712,780 (now U.S. Pat. No. 4,098,992) filed Aug. 9, 1976, which in turn is a continuation of Ser. No. 597,338, filed July 21, 1975 (now abandoned), which in turn is a continuation-in-part of Ser. No. 523,721, filed Nov. 14, 1974 (now abandoned).

SUMMARY OF THE INVENTION

This invention relates to a novel process for recovering highly pure, soluble polypropylene from a dilute solution in a spent polymerization medium and, more specifically, to a process for producing the soluble polypropylene in a fluidized form involving the steps of: (1) partial steam stripping of the volatile components of said spent organic polymerization medium to form an aqueous phase from condensed steam and a concentrated water-insoluble organic phase containing soluble polypropylene; (2) separating said water-insoluble phase from said aqueous phase and loading said phase into an evaporator; and (3) evaporating volatile components from the separated said water-insoluble phase leaving fluidized polypropylene which is thereafter drawn off, solidified and converted into a commercially useful form.

In accordance with the instant invention a continuous process of reclaiming soluble polypropylene from a dilute solution in spent organic polymerization medium containing polymerization diluent, soluble polypropylene, small amounts of a kill substance like methanol and entrained crystalline polypropylene is disclosed whereby a relatively low concentration of soluble polypropylene in said spent polymerization medium is concentrated by partial steam stripping to form an aqueous phase from condensed steam and a water-insoluble phase, which phase is a more concentrated solution of polypropylene in the remaining spent polymerization medium (amorphous concentrate), and, thereafter decanting said amorphous concentrate into a melt evaporator whereby remaining volatile components are removed leaving fluidized polypropylene which is drawn off and solidified.

BACKGROUND OF THE INVENTION

Conventional methods for the manufacture of polypropylene generally involve stereospecific polymerization of the propylene monomer in the presence of a catalyst containing a coordination complex of a transition metal halide and an aluminum alkyl compound or similar organometallic compound. The product from this reaction is a slurry of polypropylene and catalyst in a hydrocarbon diluent. A low molecular weight alcohol is normally added to this slurry to quench the reaction and solubilize the catalyst in a step sometimes referred to as the kill step. Amorphous and low molecular weight polypropylene remain in solution in the diluent as a by-product. Subsequent steps of the process generally involve recovery of the crystalline polypropylene, neutralization of the active catalyst, and recovery of the solution containing some of the alcohol and hydrocarbon diluent (spent polymerization medium). The crystalline polypropylene is normally recovered as a high purity polymer suitable for use in a wide variety of coating, casting and molding applications. The soluble polypropylene can be removed from the spent polymerization medium, after some purification, as an odorless, off-white, tacky thermoplastic material. Although at one time this material was of no commercial importance, it is now used as a hot-melt adhesive compounding agent, and in several other commercial applications.

Existing procedures for separating the soluble polypropylene, for example as set out in U.S. Pat. Nos. 3,296,240 and 3,437,645, involve partially steam stripping the spent polymerization medium at elevated temperatures. Surfactants are sometimes added to aid formation of an insoluble crumb. This solid crum can then be removed from the upper portion of the liquid and discarded or further purified for commercial use. However, the crumb takes it five to ten percent of the polymerization medium and larger amounts of the water and hence is unsuitable as removed for uses which require medium-free polymer. Additionally, the process is wasteful of the polymerization medium and the large volumes of water used are contaminated with relatively high levels of suspended solids, surfactants, polymerization media and other organic components which make the water difficult to treat by conventional waste water reclamation methods. In short, existing processes are messy, wasteful and produce unacceptably large volumes of contaminated waste water in reclaiming an amorphous polypropylene of low purity.

A method of separating low molecular weight, i.e. $\overline{M}_n$ of about 1,400, synthetic waxes made using Ziegler catalysts, metal oxide catalysts etc., e.g. waxy polyethylenes, is set out in U.S. Pat. No. 3,755,484. The process involves essentially complete stripping of the light ends from the wax to produce a wax layer over an aqueous layer, decanting the wax layer, and gas drying the decanted product.

Now a process has been found by which relatively pure soluble polypropylene can be reclaimed in an economical fashion in which the problems of contaminated waste water and polymerization diluent losses are greatly reduced.

SHORT DESCRIPTION OF THE DRAWING

The FIGURE shows one embodiment of the instant process in which partial steam stripping is done in a first step with two steam strippers, each equipped with agitation; separation, settling and decantation, are done in a second vessel (decanter) into which the aqueous and organic phase containing the soluble polypropylene (amorphous concentrate) are pumped from the first step, and a third vessel (melt evaporator) into which the amorphous concentrate is pumped and thereafter evaporated at a temperature sufficiently high to produce readily transferable fluidized polypropylene.

STATEMENT OF THE INVENTION

The feed to the first step of the process, the steam stripper, is a dilute solution of polypropylene, i.e. the spent polymerization medium in the commercial manufacture of polypropylene. It is composed primarily of the polymerization diluent used, e.g., hexane. However, other polymerization diluents such as other alkanes, chloroalkanes, etc., are treatable by the process of this invention. In general, the feed can contain small amounts of materials in addition to the polymerization diluent and soluble polypropylene such as methanol, water and entrained crystalline polypropylene. The amount of soluble polypropylene contained in the feed is generally less than about ten percent by weight and usually less than about five percent by weight. Typically, it is about one to about three weight percent polypropylene. The soluble polypropylene has a $\overline{M}_n$ above five thousand.

In the steam stripper, steam is added at a convenient temperature and at a rate designed to bring the stripper temperature to the desired value. The pressure of the steam can be any value convenient for the steam temperature used. The amount of steam used will depend upon the rate at which amorphous concentrate is to be formed for the decantation step and the entry rate of the feed, as can be understood by one skilled in the art. Agitation, generally by stirring, is desirable during the partial steam stripping to insure good thermal contact between the feed and the steam and to keep the phases mixed.

The concentration of polypropylene dissolved in the organic phase (amorphous concentrate) depends upon the temperature and pressure used in the steam stripper. In general, the concentration is determined in its maximum limit by the ease with which the amorphous concentrate can be transferred between the decantation step and the melt concentrator step and in its minimum limit by the efficiency and size of the device used in the concentrator step. This concentration preferably runs between about ten and about seventy weight percent polypropylene in the organic phase. More preferably, the concentration range runs between about thirty weight percent and about sixty weight percent and, most preferably, a concentration of about forty to about fifty-five weight percent is employed.

When hexane is used as the polymerization diluent, it has been found, for example, at 18.5 p.s.i.g. and 200° F. a weight percent amorphous concentrate of 65 weight percent is formed. At 195° F. sing the same pressure a twenty weight percent concentrate will be formed. At 5.5 p.s.i.g. and 190° F. a seventy-two weight percent concentrate will be formed and at 165° F. at the same pressure a concentrate of thirty weight percent will be formed.

To obtain about a fifty weight percent hexane amorphous concentrate in the stripper at 5.5 p.s.i.g. a temperature of 170° F. is required; at 9.5 p.s.i.g. a fifty weight percent concentrate is formed at 180° F.; at 12.0 p.s.i.g. a fifty weight percent concentrate is formed at 190° F.; at 15.0 p.s.i.g. a fifty weight percent concentrate is formed at 195° F.; and at 18.5 p.s.i.g. a fifty weight percent concentrate is formed at 205° F. If one uses too low a temperature the weight percent of polypropylene will be less and an optimal concentration may not be reachable. At too high a temperature the pressure required to maintain a desirable weight percent amorphous concentrate can be higher than convenient.

Preferably, stripper temperatures can vary between about 170° F. and about 250° F. and stripper pressures may vary between about four and about twenty-five p.s.i.g. More preferably, stripper temperatures may vary between about 170° F. and about 210° F. and pressures may vary between about five and about twenty p.s.i.g.

As an illustration of how viscosities of the amorphous concentrate are affected by temperature and polypropylene concentration, the following tabular results are helpful.

TABLE I

| VISCOSITIES OF AMORPHOUS CONCENTRATE (HEXANE SOLVENT) | | |
|---|---|---|
| Viscosity* (CPS) | Temperature (°F.) | Amorphous Concentrate Concentration (weight percent polypropylene) |
| 130 | 145 | 48.8 |
| 84 | 160 | 48.8 |
| 40 | 175 | 48.8 |
| 26 | 190 | 48.8 |
| 134 | 170 | 60.0 |
| 108 | 180 | 60.0 |
| 80 | 190 | 60.0 |
| 71 | 205 | 60.0 |

*Run at 50 RPM with Spindle 21 using a Thermocel, Brookfield-type viscometer.

It is important in choosing a concentration of amorphous concentrate that the viscosity not be too high because transfer, usually by pumping, between the steps becomes more difficult as the viscosity increases. For the particular $M_n$ values of the soluble polypropylenes treated by the process of this invention, concentrations of over about seventy percent by weight polypropylene in the amorphous concentrate are not useful.

The number of strippers used depends upon the requirements of the process as can be understood by one skilled in the art.

The agitated mixture of aqueous phase and amorphous concentrate is then separated to remove the amorphous concentrate for further treatment. The two phases can be separated by centrifugation, decantation, etc., preferably by decantation.

In one preferred decantation embodiment amorphous concentrate is transferred into a decanter at a rate depending upon the needs of the process and size of the equipment as can be understood by one skilled in the art. In the decanter the amorphous concentrate forms a top layer over the more dense aqueous phase, which aqueous phase is withdrawn and either discarded or can be cleaned up and returned to the steam stripper. Slight agitation, generally by gentle stirring of the amorphous concentrate layer in the decanter at a position just above the interface, provides a continuous dispersion of the always present but small amount of entrained crystalline polypropylene slurried in the concentrate. Without agitation this small amount of crystalline polypropylene tends to settle and agglomerate at the interface and can cause fouling problems. While the optimum rate of stirring depends on the size and shape of the decanter vessel and the size and shape of the means of agitation and can be readily determined by a person skilled in the art, preferably the rate of stirring varies from about 10 to about 80 revolutions per minute (rpm). More preferably the stirring rate varies from about 15 to about 75 rpm. Most preferably the stirring rate varies from about 20 to about 50 rpm. Typically the small amount of entrained crystalline polypropylene present in the amorphous concentrate is less than about 15 parts by weight per 100 parts by weight of soluble polypropylene. More typically the small amount of entrained crystalline polypropylene present in the amorphous concentrate is less than about 3 parts by weight per 100 parts by weight of soluble polypropylene.

It has been found by comparison of suspended solids, methanol and COD (chemical oxygen demand) that the aqueous layer removed from the decanter is purer than the water removed during a typical crumbing operation which can attach a substantial economic and environmental benefit to the instant process.

The temperature of the decanter is preferably held at about the average temperature of the stripper by supplemental heating if necessary. To prevent further concentration of the amorphous concentrate, the decanter pressure is preferably the same or somewhat higher. The average decanter temperature preferably is not more than about 2° F. above the average temperature at which the stripper operates and the average decanter pressure is at least about that used in the stripper and, beneficially, not more than about twice the average stripper pressure. The pressure in the decanter can be set by a pressure control device attached to a pressure tank so that pressure fluctuations can be smoothed out by the additions of a relatively inert gas such as nitrogen. Compressed air can be used for this purpose as well, however, with less desirable results. The temperature of the decanter is maintained by supplemental heating, for example, with steam coils and the like.

Amorphous concentrate generally containing the small amount of entrained crystalline polypropylene described hereinabove is transferred from the top layer of the decanter into the melt evaporator which is beneficially a thin film, wiped surface evaporator. A LUWA thin film, wiped surface evaporator made by the LUWA Corp., Charlotte, N.C. is preferred. Other types of evaporators may also be used.

The remainder of the volatiles are removed in the melt evaporator as overhead and the resulting relatively pure polypropylene is fluidized. The temperature of the melt evaporator is regulated such that the fluidized polypropylene has a temperature preferably in the range of about 300° F. to about 475° F., more preferably about 325° F. to about 425° F., and, most preferably, about 325° F. to about 375° F. The melt evaporator is generally operated at about atmospheric pressure.

The fluidized polypropylene runs to the bottom of the evaporator where it can be withdrawn, conveniently by a melt pump, and sent to storage to be solidified and converted into a commercially usable form.

The temperature at which the melt evaporator is operated depends somewhat upon the melt flow rate of the crystalline polypropylene made in the process from which the feed originated because the viscosity range of the soluble polymer in the melt evaporator is thereby affected. If the melt flow rate of the crystalline product being made is ten to fifteen, for example, the temperature of the melt evaporator can be at the lower end of the ranges given above and, if the melt flow rate of the crystalline polypropylene being made is one to two, the temperature of the melt evaporator should be higher to make the fluidized polypropylene easily removable. The melt evaporator temperature also depends somewhat upon the amount of crystalline polypropylene entrained in the amorphous concentrate as the presence of crystalline polymer increases the viscosity of the fluidized polypropylene. The operating temperature of the melt evaporator for a given stripper feed will be evident to one skilled in the art.

Stabilizers and other additives are beneficially added to either the decanter or the melt evaporator, preferably the evaporator, for dispersal into the polypropylene product. The amounts and types of such materials are known to those skilled in the art.

One of the beneficial aspects of the herein described process is the ready interconvertibility into the standard crumbing operation. In such a mode, the decanter and melt evaporator are not employed and the stripper is operated at the same temperature but at a lower pressure than that generally used in the process described herein. The additional changes necessary for the normal crumbing operation are to add surfactant of the kind normally used in the crumbing process and operation of the stripper in a way which makes easy the removal of crumb from the water.

With reference to the Figure, the process is carried out as follows. Spent polymerization medium enters through line 1 where it is split into two streams, one feeding the first stripper 7 via line 3 and the second feeding stripper 27 through line 5. Steam enters strippers 7 and 27 through lines 4 and 28. The overhead from strippers 7 and 27 leaves through lines 15 and 35, passes through heat exchangers 17 and 37 and then through lines 19 and 39 into condenser drums 21 and 41. Water condensate is removed from condenser drums 21 and 41 through lines 23 and 43 and may be returned to strippers 7 and 27 or to waste. The organic portion of the condensate is removed through lines 25 and 45 and desirably put through clean-up to recover the polymerization diluent. Strippers 7 and 27 are agitated by means of stirrers 8 and 28.

Mixtures of aqueous phase and amorphous concentrate leave strippers 7 and 27 through lines 9 and 29 and are transferred by pumps 11 and 31 through lines 13 and 33 into decanter 47. Separation of the phases takes place in decanter 47 and the lower aqueous phase is drawn off through line 49 and either discarded or returned after purification to strippers 7 and 27. Decanter 47 is stirred gently by stirrer 48, the stirrer blades being positioned just above the aqueous layer-amorphous concentrate interface. Supplemental heating of decanter 47 is accomplished by means of a heat transfer liquid entering through line 46 and exiting through line 50. The decanter pressure is controlled by a pressure set valve in line 44 connected to a nitrogen supply.

Amorphous concentrate is transferred from the top of decanter 47 through line 51 by pump 52 into melt evaporator 53. Additives either molten or dissolved in a small amount of diluent can be passed through line 57 either into the feed of melt evaporator 53 or directly into evaporator 53 through line 55, or both. Overhead is taken off from melt evaporator 53 through line 59 into overhead condenser 61. Condensate from overhead condenser 61 is passed into condensing drum 67 where, after settling, the organic portion is passed out through line 71 to clean-up prior to its return to the polymerization process. Water collected in condensation drum 67 is passed out through line 69 either to waste or to strippers 7 and 27.

Molten polypropylene falls to the bottom of melt evaporator 53 and is drawn out through line 73 into surge pot 75 and thereafter through line 77 to melt pump 79 and on to solidification and storage.

While the invention is described in connection with the specific EXAMPLE below, it is to be understood that it is for illustrative purposes only. Many alternatives, modifications and variations will be apparent to those skilled in the art in the light of the below Example and such alternatives, modifications and variations fall within the scope and spirit of the appended claims.

EXAMPLE

A spent hexane-polymerization-medium containing between 2.0 and 2.8 weight percent soluble polypropylene, less than 0.06 weight percent entrained crystalline polypropylene (i.e. no more than 3 parts by weight entrained crystalline polypropylene per 100 parts by weight soluble polypropylene), about fifty ppm water and between 0.28 and 0.074 weight percent methanol was used as feed. The operating pressure of the steam stripper was set at 11.5 p.s.i.g. and the operating temperature at 185° F. Pressure was controlled via a back pressure controller regulating an air-to-open Research Control valve. Due to on-off operation of the steam sparge, the pressure fluctuated between about 11.0 and 12.5 p.s.i.g. Vigorous agitation in the stripper was provided by an air motor and two four-blade turbines on the shaft. Temperature in the stripper was regulated via a temperature controller activating an off-on solenoid in the steam inlet line. During normal operation the temperature fluctuation was about ±2° F.

Spent medium was continuously fed to the stripper. Stripper concentrate, i.e. hexane, methanol and water, were continuously removed overhead and upon condensation contained approximately six volume percent water and ninety-four volume percent hexane. The liquid contents of the stripper were drawn off into the decanter.

The decanter was operated at the same temperature as the stripper. A minimum pressure equal to the desired pressure in the stripper was provided by a pressure regulated nitrogen line to prevent additional losses. A temperature controlled on-off solenoid regulated the heat input of the steam coils contained in the decanter. Slight agitation of the amorphous concentrate, top layer, at the phase interface provided for continuous dispersion of the always present, small amount of crystalline polypropylene. Without agitation, this crystalline material tends to settle out and agglomerate at the interface.

The amorphous concentrate in the top layer varied between about 39.5 and 55.6 weight percent polypropylene with less than one percent water, the remaining material being primarily hexane and a small amount of methanol. The aqueous phase, bottom layer, which was drained from the decanter showed on analysis between about 20 and 193 ppm of suspended solids, between about 220 and about 1,900 ppm of methanol and a COD of about 630 to 2,400.

The amorphous concentrate, top layer, was decanted into the melt evaporator through its four inlet ports operating at ambient pressure. These ports are located immediately above a two-tiered, conical flashing coil through which heated Therminol (a heat transfer fluid) was pumped. The surface temperature of the bottom coil was maintained at about 420° F. and the top coil just below the entry ports was about 360° F. Additional heat was added at the bottom of the melt evaporator to keep the polypropylene pool at about 425° F.

The overhead from the evaporator was hexane and water with a small amount of methanol and when condensed was typically about ninety-six to ninety-eight volume percent hexane and two to four volume percent water. Most of the polypropylene when solidified analyzed less than one weight percent hexane, less than 0.03 weight percent water and contained no detectable amount of methanol.

The Table below shows viscosity ranges at 375° F. for recovered polypropylene made by the process of this EXAMPLE as a function of the MFR of the crystalline product made in the process from which the feeds were derived.

TABLE II

RECOVERED POLYPROPYLENE VISCOSITY AT 375° F. AS A FUNCTION OF THE CRYSTALLINE MFR MADE

| Crystalline MFR*** | $\overline{M}_n$ | Recovered PP Viscosity Range (CPS)* |
|---|---|---|
| 1.5–2.2 | | 1,176–1,492 |
| 3.3–4.0 | 10,350** | 900–1,732 |
| 4.0–5.0 | | 535–940 |
| 5.0–5.5 | | 382–455 |
| 10.0–11.0 | 5,640 | 287–475 |

*Run at 20 RPM with spindle 21 using a Thermocel, Brookfield-type viscometer.
**MFR equal to 3.3.
***ASTM D 1238.

What is claimed is:

1. A method for continuous recovery of soluble polypropylene, having a number average molecular weight in excess of 5,000, from spent polymerization medium consisting essentially of:
   a. steam stripping, at a temperature between 170° F. and about 250° F., under a pressure between about 4 and about 25 psig, said polymerization medium to form a two-phase system comprising an organic phase and an aqueous phase wherein said organic phase comprises between about 10 and 39.5 weight percent soluble polypropylene and a small amount of entrained crystalline polypropylene;
   b. decanting said organic phase from said aqueous phase while gently stirring at a position just above interface between said organic phase and said aqueous phase while maintaining the temperature and pressure at about said temperature and said pressure of said steam stripping, respectively; and
   c. removing essentially all remaining volatile material from said organic phase of step (b) while heating said organic phase to between about 300° F. and 475° F. by means of a heat transfer surface, whereby there is recovered polypropylene of sufficient fluidity to be readily transfered.

2. The method of claim 1 wherein said organic phase in step (a) comprises between about 10 and about 30 weight percent soluble polypropylene.

3. The method of claim 1 wherein said small amount of entrained crystalline polypropylene is no more than about 3 parts by weight per 100 parts by weight of soluble polypropylene.

4. In a process for forming crystalline polypropylene involving the steps of contacting propylene monomer with an active catalyst in the presence of a hydrocarbon diluent, recovering crystalline polypropylene, recovering spent polymerization medium which comprises hydrocarbon diluent, soluble polypropylene having a number average molecular weight in excess of 5,000 and a small amount of entrained crystalline polypropylene, the improvement which comprises a method for continuously recovering said soluble polypropylene consisting essentially of the steps:
   a. steam stripping, at a temperature between 170° F. and about 250° F., under a pressure between about 4 and about 25 psig, said polymerization medium to form a two-phase system comprising an organic phase and an aqueous phase wherein said organic phase comprises between about 10 and 39.5 weight percent soluble polypropylene and said small amount of entrained crystalline polypropylene;
   b. decanting said organic phase from said aqueous phase while gently stirring at a position just above interface between said organic phase and said aqueous phase while maintaining the temperature and pressure at about said temperature and said pressure of said steam stripping, respectively; and c. removing essentially all remaining volatile material from said organic phase of step (b) while heating said organic phase to between about 300° F. and 475° F. by means of a heat transfer surface, whereby there is recovered polypropylene of sufficient fluidity to be readily transfered.

5. The method of claim 4 wherein said organic phase in step (a) comprises between about 10 and about 30 weight percent soluble polypropylene.

6. The method of claim 4 wherein said small amount of entrained crystalline polypropylene is no more than 3 parts by weight crystalline polypropylene per 100 parts by weight of soluble polypropylene.

7. A method for continuous recovery of soluble polypropylene, having a number average molecular weight in excess of 5,000, from spent polymerization medium consisting essentially of:

a steam stripping, at a temperature between 170° F. and about 250° F., under a pressure between about 4 and about 25 psig, said polymerization medium to form a two-phase system comprising an organic phase and an aqueous phase wherein said organic phase comprises between about 10 and 39.5 weight percent soluble polypropylene and less than about 15 parts by weight of entrained crystalline polypropylene per 100 parts by weight of said soluble polypropylene;

b. decanting said organic phase from said aqueous phase while gently stirring at a position just above interface between said organic phase and said aqueous phase while maintaining the temperature and pressure at about said temperature and said pressure of said steam stripping, respectively; and c. removing essentially all remaining volatile material from said organic phase of step (b) while heating said organic phase to bebetween about 300° F. and 475° F. by means of a heat transfer surface, whereby there is recovered polypropylene of sufficient fluidity to be readily transfered.

* * * * *

UNITED STATES PATENT AND TRADEMARK OFFICE
CERTIFICATE OF CORRECTION

PATENT NO. : 4,362,865

DATED : December 7, 1982

INVENTOR(S) : Benjamin P. Belles

It is certified that error appears in the above-identified patent and that said Letters Patent is hereby corrected as shown below:

```
Column 1, line 8,  "63,726" should read -- 063,726 --
Column 2, line 16, "solid crum" should read -- solid crumb --
Column 2, line 19, "takes it" should read -- takes with it --
Column 3, line 39, "200°F" should read -- 220°F --
Column 4, line 22 "Mn" should read -- $\bar{M}_n$ --
Column 9, line 21, "a steam" should read -- a. steam --
```

Signed and Sealed this

Twenty-second Day of November 1983

[SEAL]

Attest:

GERALD J. MOSSINGHOFF

*Attesting Officer*   *Commissioner of Patents and Trademarks*